United States Patent
Roosendaal et al.

(10) Patent No.: US 9,395,474 B2
(45) Date of Patent: Jul. 19, 2016

(54) COLOR SUBTRACTIVE DISPLAY HAVING A VERTICAL STACK OF AT LEAST TWO DIFFERENT COLOR ABSORBING LAYERS

(71) Applicant: KONINKLIJKE PHILIPS N.V., Eindhoven (NL)

(72) Inventors: Sander Jurgen Roosendaal, Eindhoven (NL); Martinus Hermanus Wilhelmus Maria Van Delden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 14/132,420

(22) Filed: Dec. 18, 2013

(65) Prior Publication Data

US 2014/0104277 A1    Apr. 17, 2014

Related U.S. Application Data

(63) Continuation of application No. 12/516,035, filed as application No. PCT/IB2007/054805 on Nov. 27, 2007, now Pat. No. 8,638,274.

(30) Foreign Application Priority Data

Nov. 30, 2006  (EP) ..................... 06125052

(51) Int. Cl.
   *G02B 5/20*    (2006.01)
   *G09G 5/22*    (2006.01)
   *G02B 5/22*    (2006.01)
   *G09G 5/02*    (2006.01)
   *G02F 1/167*   (2006.01)
   *G09G 3/34*    (2006.01)
   (Continued)

(52) U.S. Cl.
   CPC    *G02B 5/201* (2013.01); *G02B 5/22* (2013.01); *G02F 1/133514* (2013.01); *G02F 1/167* (2013.01); *G09G 3/344* (2013.01); *G09G 3/348* (2013.01); *G09G 5/02* (2013.01); *G09G 5/227* (2013.01); *G02F 2001/1678* (2013.01); *G02F 2201/52* (2013.01); *G02F 2203/34* (2013.01); *G09G 3/38* (2013.01); *G09G 2300/023* (2013.01); *G09G 2300/0434* (2013.01); *G09G 2300/0452* (2013.01); *G09G 2340/0407* (2013.01); *G09G 2340/0428* (2013.01); *G09G 2340/06* (2013.01)

(58) Field of Classification Search
   CPC ......... G09G 3/344; G09G 3/348; G09G 3/38; G09G 5/02; G09G 5/227; G09G 2300/023; G09G 2300/0434; G09G 2300/0452; G09G 2340/0407; G09G 2340/0428; G09G 2340/06; G02F 1/133514; G02F 1/167; G02F 2001/1678; G02F 2201/52; G02F 2203/34; G02B 5/201; G02B 5/22
   See application file for complete search history.

(56) References Cited

U.S. PATENT DOCUMENTS 4,886,343 A    12/1989  Johnson
5,587,819 A    12/1996  Sunohara et al.
(Continued)

FOREIGN PATENT DOCUMENTS

CN    1633623 A    6/2005
CN    1652569 A    8/2005
(Continued)

*Primary Examiner* — Keith Crawley (57) ABSTRACT

A display includes a vertical stack of at least two different color absorbing layers of pixels. The pixel resolution of at least two of the layers is different.

17 Claims, 5 Drawing Sheets (51) Int. Cl.
  *G02F 1/1335* (2006.01)
  *G09G 3/38* (2006.01)

(56) References Cited

U.S. PATENT DOCUMENTS

| | | |
|---|---|---|
| 6,724,948 B1 | 4/2004 | Lippincott |
| 7,567,370 B2 | 7/2009 | Stellbrink et al. |
| 8,038,316 B2 * | 10/2011 | Silverstein et al. ........... 362/231 |
| 2002/0102480 A1 | 8/2002 | Washizu et al. |
| 2002/0171620 A1 | 11/2002 | Gordon et al. |
| 2003/0231162 A1 | 12/2003 | Kishi |
| 2004/0169912 A1 | 9/2004 | Liang et al. |
| 2005/0104843 A1 | 5/2005 | Schlangen |
| 2005/0134735 A1 | 6/2005 | Swartz |
| 2005/0162737 A1 * | 7/2005 | Whitehead et al. ........... 359/454 |
| 2005/0243047 A1 | 11/2005 | Asao |
| 2006/0061530 A1 | 3/2006 | Yuasa |
| 2007/0195399 A1 | 8/2007 | Aylward et al. |

FOREIGN PATENT DOCUMENTS

| | | |
|---|---|---|
| JP | 02110430 A | 4/1990 |
| JP | 2005141080 A | 6/2005 |
| JP | 2006039555 A | 2/2006 |
| WO | 2005040908 A1 | 5/2005 |

* cited by examiner

COLOR SUBTRACTIVE DISPLAY HAVING A VERTICAL STACK OF AT LEAST TWO DIFFERENT COLOR ABSORBING LAYERS

This application claims the benefit or priority of and describes relationships between the following applications: wherein this application is a continuation of U.S. patent application Ser. No. 12/516035, filed May 22, 2009, which is the National Stage of International Application No. PCT/IB2007/054805, filed Nov. 27, 2007, which claims the priority of foreign application EP 06125052.8 filed Nov. 30, 2006, all of which are incorporated herein in whole by reference.

The invention relates to a display comprising a vertical stack of at least two different color absorbing layers.

The invention also relates to a display system comprising such a display and a method for controlling such a display.

An example of a display comprising a vertical stack of at least two different color absorbing layers is disclosed in US2002/0171620. More precisely, US2002/0171620 relates to a transmissive color electrophoretic display incorporated with a backlight. The display has a plurality of laterally adjacent pixels. Each pixel is comprised of two or more cells which are vertically stacked, one directly above the other. Each cell in a stack also has laterally adjacent like cells which together form a layer of cells in the display. The cells contain a light-transmissive fluid and charged pigment particles that can absorb a portion of the visible spectrum, with each cell in a stack containing particles having a color different from the colors of the particles in the other cells in the stack. The color of a pixel is determined by the portion of the visible spectrum originating from the backlight that survives the cumulative effect of traversing each cell in the stack, hence the denotation color subtractive display. Suitable cell colors for the display in US2002/0171620 include cyan (C), magenta (M) and yellow (Y), yielding a three layer display. In CMY, magenta plus yellow produces red, magenta plus cyan makes blue and cyan plus yellow generates green. The amount and color of the light transmitted by each cell is controlled by the position and the color of the pigment particles within the cell. The position, in turn, is directed by the application of appropriate voltages to electrodes of the cell. When the pigment particles are positioned in the path of the light that enters the cell, the particles absorb a selected portion of this light and the remaining light is transmitted through the cell. When the pigment particles are substantially removed from the path of the light entering the cell, the light can pass through the cell and emerge without significant visible change. The color/spectrum of the light seen by the viewer, therefore, depends on the distribution of particles in each of the cells in the vertical stacks. Since each of the cells in the stack occupy the same lateral area as the pixel itself, the transmission efficiency can be significantly higher than that of solutions that rely on a side-by-side arrangement of subpixels to generate color.

However, a problem with the display disclosed in US2002/0171620 is that it may be difficult to manufacture because of the need to accurately vertically align individual pixels in the respective cell layers and the need to minimize the thickness of the intermediate light-transmissive windows to avoid color cross-talk between pixels.

It is an object of the invention to overcome or at least alleviate this problem, and to provide an improved color subtractive display.

This and other objects that will be apparent from the following description are achieved by means of a display, a display system comprising such a display, and a method for controlling such a display, according to the appended claims.

According to a first aspect, there is provided a display comprising a vertical stack of at least two different color absorbing layers of pixels, characterized in that the pixel resolution of at least two of the layers is different.

The invention is based on the understanding that the resolution of some layers can be decreased without significantly affecting the display output as perceived by a viewer, since human vision is more sensitive to luminance detail than chrominance detail. Hence, a layer comprising color(s) determining the chrominance can have a lower resolution than a layer comprising color(s) determining the luminance For instance, a layer comprising cyan and/or yellow can have lower resolution than a layer comprising magenta. The human eye has a lower resolution sensitivity (fewer cones) for blue and red, which are governed by yellow and cyan respectively, than for green, while the human eye (namely the rods) are capable of perceiving high resolution with respect to luminance, which is governed mainly by magenta. Being able to use layers of lower pixel resolution very much facilitates the manufacturing of the display.

The area ratio of a cyan pixel to a magenta pixel can for example be 4:1 (i.e. the area of a cyan pixel is four times the area of a magenta pixel, or in other words the cyan pixel resolution is ¼ of the magenta pixel resolution), while the area ratio of a yellow pixel to a magenta pixel can be up to 16:1 (i.e. the area of a yellow pixel is up to sixteen times the area of a magenta pixel, or in other words the yellow pixel resolution is down to 1/16 of the magenta pixel resolution), as confirmed by experiments. That is, for one yellow pixel there are four cyan pixels and 16 magenta pixels, for example.

Preferably, the layer having the lowest resolution is a top layer placed at the viewing side of the display and layers having higher resolution are placed gradually further down in the stack. Thus, the layer having highest resolution becomes the bottom layer. This reduces parallax effects and cross-talk between pixels.

In a preferred embodiment of the display, a top layer comprises yellow, an intermediate layer comprises cyan and a bottom layer comprises magenta, wherein the bottom layer has higher resolution than the intermediate layer and the intermediate layer has higher resolution than the top layer. Such a display benefits from both simplified manufacturing and reduced cross-talk as discussed above. Alternatively, the top layer can comprise both yellow and cyan, whereby the intermediate layer can be omitted, which in turn reduces both misalignments (two layers instead of three) and the display thickness. Pure black can be added in the magenta layer or in a dedicated additional layer.

Further, at least one layer can be provided with light shields for covering collector areas in the pixels of said at least one layer. The collector area is the area of the pixel where the color particles are accommodated when the pixel is in its transparent state. Thereto, the light shields are used to ensure that the color of the collector area does not change depending on the state of the pixel. The light shield could be separate or formed by a collector electrode of the collector area. Preferably, for a display with magenta, cyan and yellow layers, the light shields are provided in the magenta layer only, since the magenta layer should have the highest resolution. Nevertheless, lighting shields could be provided in all three layers.

Further, the shape of the pixels can be one of square and hexagonal. Square pixels is the straightforward approach. However, a layout with hexagonal pixels arranged in a honeycomb pattern makes it easier to display diagonal lines, scaling may be less visible, especially since a magenta pixel can be placed exactly in the center of each cyan and yellow pixel, and any light shields may be less visible since the collector areas of the different layers are not vertically aligned to the same extent as in the approach with square pixels.

The display according to the invention can be a reflective or transmissive type display. In the latter case, the display is preferably integrated with a backlight. Further, the display according to the invention can be an electrophoretic, electrowetting or electrochromic display.

According to another aspect, there is provided a display system comprising a display according to the above description, and a control unit adapted to receive a video signal, scale the video signal in accordance with the resolutions of the display layers, and control the display in accordance with the scaled image signal. This aspect exhibits similar advantages as the previously discussed aspect of the invention.

The scaling serves to adapt a typical source video (e.g. RGB) signal where all the colors have the same resolution to the inventive display having color absorption layers of different resolutions. The scaling can for example be performed by averaging, over a group of higher resolution pixels (e.g. magenta pixels), a scaling property of one or more lower resolution pixel(s) (e.g. cyan or yellow). The scaling property can be the optical density, luminance, bit level, etc.

According to yet another aspect, there is provided a method for controlling a display according to the above description, the method comprising receiving a video signal, scaling the video signal in accordance with the resolutions of the display layers, and controlling the display in accordance with the scaled video signal. This aspect exhibits similar advantages as the previously discussed aspects of the invention.

Examples of the invention will now be described in detail with reference to the accompanying drawings, in which:

FIG. 1b is a top view of the display of FIG. 1a;

FIG. 3b is a top view of the display of FIG. 3a;

It should be noted that these figures are diagrammatic and not drawn to scale. Relative dimensions and proportions of parts of these figures have been shown exaggerated or reduced in size, for the sake of clarity and convenience in the drawings.

Figure 1A:
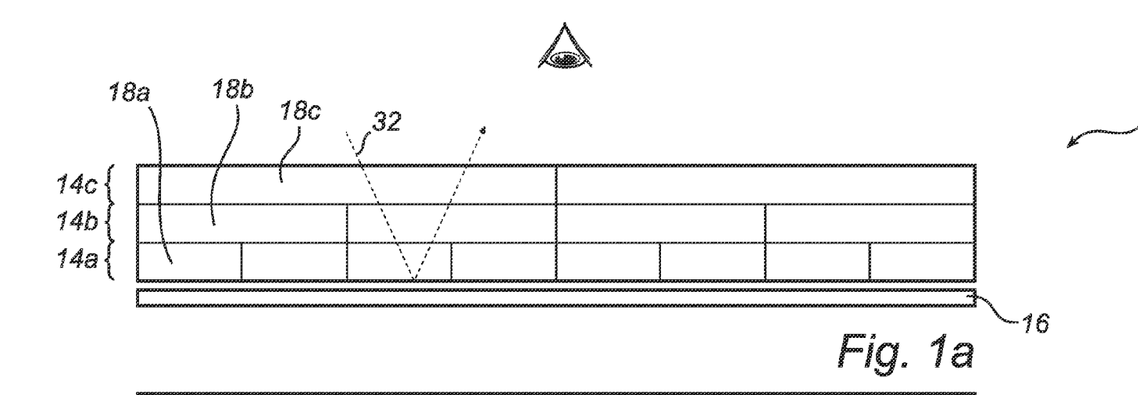
FIG. 1a is a side sectional view of a display with three color absorbing layers according to an embodiment of the present invention.
Figure 1B:
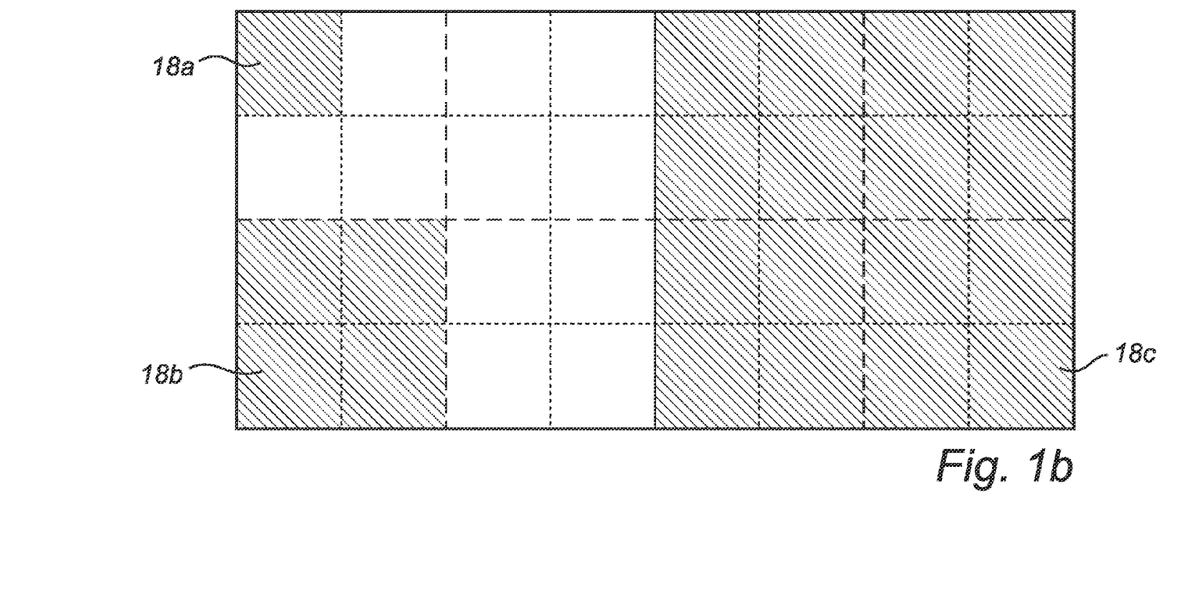

FIGS. 1a-1b illustrate a color subtractive electrophoretic display 10 according to an embodiment of the present invention. The display 10 comprises three vertically stacked layers 14a, 14b and 14c. An element 16 is provided at the back of the stack. In case of a reflective type display, the element 16 is preferably a reflector. In case of a transmissive type display, the element 16 is preferably a light source such as a backlight.

Figure 2A:
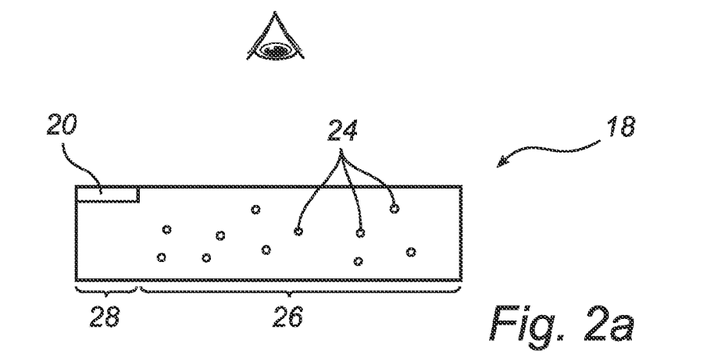
FIGS. 2a-2b are side sectional views of an exemplary pixel in the display of FIGS. 1a-1b.
Figure 2B:
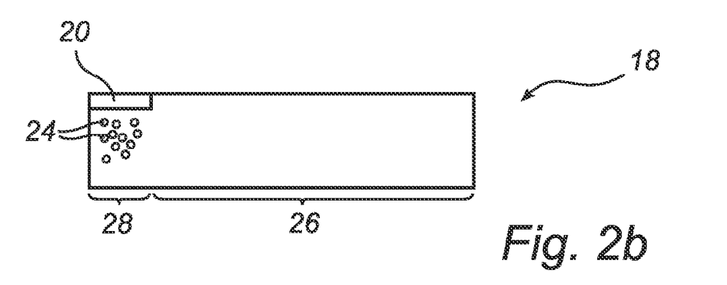

Each layer 14 of the stack comprises a plurality of pixels 18 arranged side by side in the layer. An exemplary pixel 18 is illustrated in more detail in FIGS. 2a-2b. The pixel 18 comprises at least one addressable electrode, here illustrated by a collector electrode 20. The electrode 20 can for example be placed at an upper corner of the pixel 18, as in FIGS. 2a-2b.

Alternatively, it can be placed along a side wall of the pixel. The pixel 18 further has a suspension of charged color absorbing particles 24 movable within the pixel 18. By appropriately changing the voltage of the electrode 20, the pixel 18 can switch between a distributed or absorbing state (FIG. 2a) and a collected or transparent state (FIG. 2b) as well as several intermediate states. In the distributed state, no voltage is applied to the electrode 20 and the particles 24 can be generally uniformly distributed throughout the pixel 18 in a viewing area 26 covering most of the horizontal area of the pixel 18. Portions of light traversing the pixel 18 in this state may be absorbed depending on the color of the particles 24 in the pixel 18. For example in case of magenta particles and incoming white light, wavelengths of the white light are absorbed such that light from the pixel 18 will appear magenta to a viewer. On the other hand, in the collected state, a voltage is applied to the electrode 20 (negative voltage for positive particles 24 or positive voltage for negative particles 24, for instance), whereby the particles 24 are attracted by the electrode 20 to a collector area 28 covering a limited portion of the horizontal area of the pixel 18. In this state, the pixel 18 is essentially transparent, and any light striking the pixel 18 will pass through it virtually unchanged. The electrode 20 can here function as a light shield covering the collector area 28 so that the perceived color of the collector area 28 does not change depending on the pixel state. To this end, the electrode 20 is preferably black. Alternatively, a dedicated light shield could be provided. In intermediate states (not shown), part of the particles 24 is collected and part of the particles 24 is distributed. To avoid that voltages applied in a pixel do not lead to disturbing field lines in other pixels, the dielectric constant and conductivity of a substrate, the electrode, the suspension or other elements of the pixel should be selected appropriately. Also, additional electrodes could be provided to enhance the controllability of the particles.

Returning to FIGS. 1a-1b, the bottom layer 14a of the display 10 comprises magenta, i.e. the pixels 18a in the layer 14a comprises magenta particles. Further, the intermediate layer 14b comprises cyan, and the top layer 14c at the viewing side of the display 10 comprises yellow. By appropriately switching the states of the pixels 20 in the different layers 14a, 14b and 14c, various output colors as perceived by a viewer can be achieved. That is, the color of a certain stack of pixels 18 is determined by the portion of the visible spectrum of the input light that survives the cumulative effect of traversing each layer 14 (color subtractive display).

The various output colors based on input of white light and depending on the different states of the layers 14a, 14b and 14c are listed in Table 1 below. In Table 1, "—" denotes a transparent state, "X" denotes an absorbing state, "W" denotes white, "M" denotes magenta, "C" denotes cyan, "Y" denotes yellow, "B" denotes blue, "R" denotes red, "G" denotes green, and "K" denotes black. The scheme listed in Table 1 is usually referred to as the CMYK color model, where C is cyan, M is magenta, Y is yellow and K is black.

TABLE 1

| Yellow layer 14c | — | — | — | X | — | X | X | X |
|---|---|---|---|---|---|---|---|---|
| Cyan layer 14b | — | — | X | — | X | — | X | X |
| Magenta layer 14a | — | X | — | X | X | X | — | X |
| Output color | W | M | C | Y | B | R | G | K |

According to the invention, that different layers 14a, 14b and 14c have different pixel resolutions. In the embodiment of FIG. 1, the area ratio of a cyan pixel 18b to a magenta pixel 18a is 4:1, while the area ratio of a yellow pixel 18c to a magenta pixel 18a is 16:1. That is, for one yellow pixel 18c there are four cyan pixels 18b and 16 magenta pixels 18a. In FIG. 1b, the magenta pixels 18a are shown with dotted lines, the cyan pixels 18b are shown with dashed lines, and the yellow pixels 18c are shown with solid lines.

Despite the lower resolution of cyan and yellow, the display 10 has a similar performance as a conventional display where all layers have the same resolution, as discussed above. Being able to use layers of lower pixel resolution very much facilitates the manufacturing of the display 10.

An additional benefit is realized by sorting the layers 14 in the stack according to resolution, with the lowest resolution (here the yellow layer 14c) at the top and the layer with the highest resolution (here the magenta layer 14a) at the bottom. This reduces parallax effects and cross-talk between pixels. Namely, in a conventional display where all layers have the same resolution, there is a high probability of an "oblique" light beam traveling through different pixels on the way in and out (in a reflective display), leading to parallax effects and pixel cross-talk. However, in the inventive display, since the top pixels are larger than the bottom pixels, the probability of a light beam traveling through different pixels on the way in and out is diminished. This is illustrated by exemplary ray trace 32, which travels through the same yellow pixel 18c on the way in and out.

The above mentioned dedicated light shields are preferably provided in the magenta layer 14a only, since the magenta layer 14a has the highest resolution. Nevertheless, lighting shields could be provided in all three layers 14a-c.

Figure 3A:
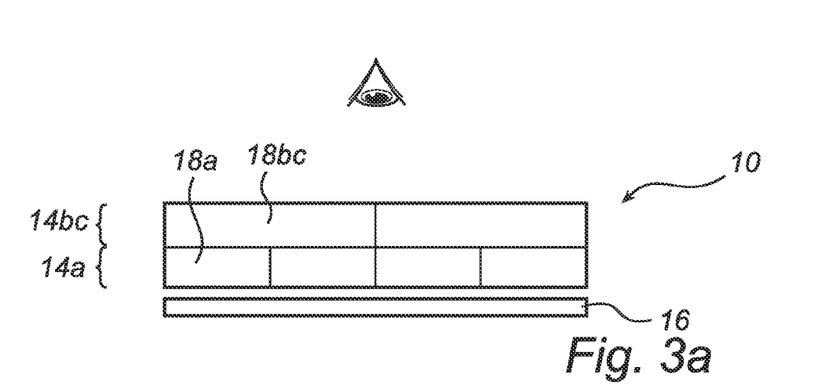
FIG. 3a is a side sectional view of a display with two color absorbing layers according to another embodiment of the present invention.
Figure 3B:
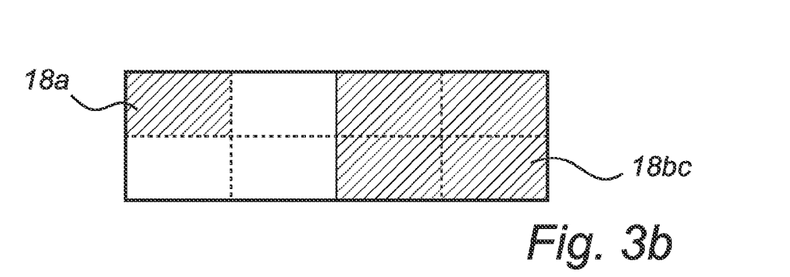
Figure 4A:
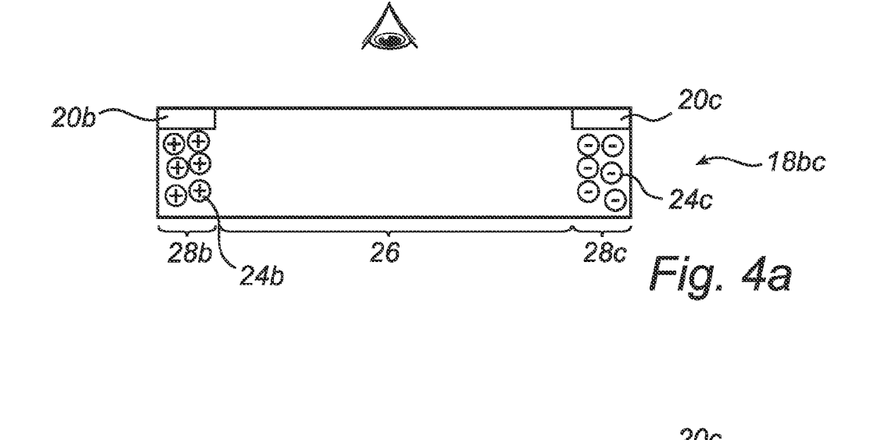
FIGS. 4a-4d are side sectional views of an exemplary pixel in the display of FIGS. 3a-3b.
Figure 4B:
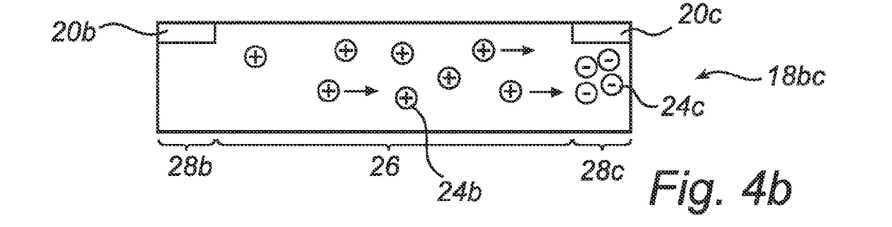
Figure 4C:
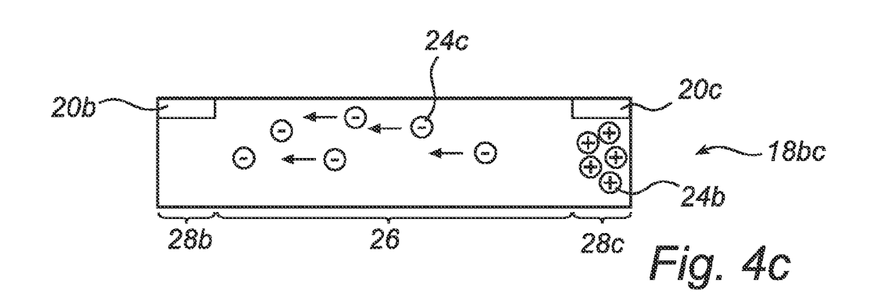
Figure 4D:
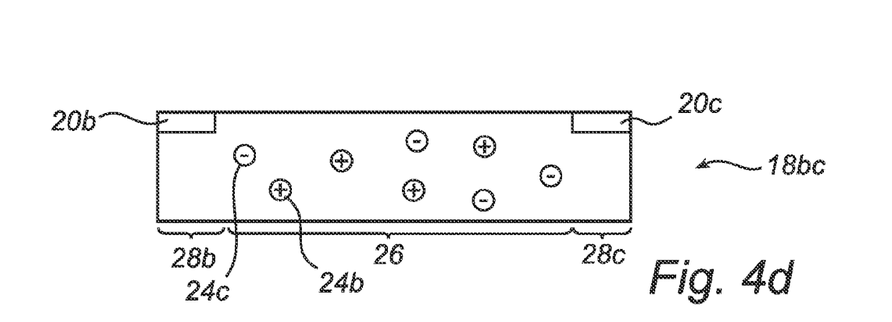

FIGS. 3a-3b illustrate a color subtractive electrophoretic display 10 according to another embodiment of the present invention. In contrast to the display of FIGS. 1a-1b, this display comprises only two layers 14, wherein the top layer 14bc comprises both yellow and cyan, while the bottom layer 14a comprises magenta. This yields for a different pixel design in the layer 14bc. An exemplary pixel 18bc is depicted in more detail in FIGS. 4a-4d. The pixel 18bc comprises two addressable collector electrodes 20b and 20c. The electrodes 20b and 20c are preferably placed at upper opposite corners of the pixel 18bc. Alternatively, they can be placed along opposite side walls 22 of the pixel 18bc. The suspension of pixel 18bc further comprises both cyan and yellow particles 24b and 24c, which except for color differ in at least one other property. In this example, the cyan particles 24b have a positive charge and high mobility, while the yellow particles 24c have a negative charge and low mobility. By appropriately changing the voltages Vb, Vc of the electrodes 20b and 20c (voltage level, duration, etc.), the pixel 18bc can switch between at least four states. In the first state (FIG. 4a), Vb=−V and Vc=+V, whereby the cyan particles 24b are attracted by the electrode 20b to the collector area 28b and the yellow particles 24c are attracted by the electrode 20c to the collector area 28c. In this state, the pixel 18bc is essentially transparent, and any light striking the pixel 18bc will pass through it virtually unchanged. Thereafter, the field is reversed. If the pulse is short, the viewing area 26 will be occupied by the quick cyan particles 24b only moving in an essentially in-plane direction towards the electrode 20c (FIG. 4b), while the slower yellow particles 24c remain at or close to the collector area 24c. In this second state, for input of white light, the pixel 18bc will appear cyan to a viewer (see Table 1 above). On the other hand, if the pulse is long, the quick cyan particles 24b will be collected at the collector area 24c (FIG. 4c), while the viewing area 26 will be occupied by the slower yellow particles 24b only. Therefore, in this third state, the pixel 18bc will appear yellow to a viewer. Finally, by applying an intermediate pulse, together with AC "shaking" or other means to promote brownian motion (prevent sticking) of the particles, a mixed state may be achieved in which all particles 24b and 24c are distributed throughout the pixel 18bc in the viewing area 26. In this fourth state, the pixel 18bc will appear green to a viewer. Optionally, each electrode 20 can be provided with a light shield (not shown), as discussed above. To avoid that voltages applied in a pixel do not lead to disturbing field lines in other pixels, the dielectric constant and conductivity of a substrate, the electrodes, the suspension or other elements of the pixel should be selected appropriately. Also, other properties in addition to polarity and mobility that can be utilized to control the different color particles in each cell include charge magnitude, threshold field, bi-stability, or combinations thereof. Also, additional electrodes could be provided to enhance the controllability of the different color particles.

Returning to FIGS. 3a-3b, the top cyan and yellow layer 14bc has a lower pixel resolution than the magenta layer 14a, in accordance with the invention. In an exemplary display, the area ratio of a cyan and yellow pixel 18bc to a magenta pixel 18a is 4:1. In other words, for one cyan and yellow pixel 18bc there are four magenta pixels 18a. Thus, the area ratio of a yellow pixel to a magenta pixel in FIGS. 3a-3b is lower than in FIGS. 2a-2b (4:1 compared to 16:1). In FIG. 3b, the magenta pixels 18a are shown with dotted lines and the cyan and yellow pixels 18bc are shown with solid lines. As above, despite the reduced resolution, the display performance is fully adequate.

The display of FIGS. 3a-3b further exhibits similar advantages as the display of FIGS. 1a-1b discussed above, i.e. simplified manufacturing, reduced parallax and reduced cross-talk. Additionally, the display of FIGS. 3a-3b can be made thinner since one layer is omitted. Also, only two layers have to be stacked and aligned instead of three layer, which reduces the risk for misalignments.

In both display embodiments shown above, pure black can be added. One reason why it is desirable to add pure black is that a mixture of cyan, magenta and yellow pigments does not produce pure black, but a dark murky color. The straightforward approach for adding pure black is to include an additional layer with pixels comprising black particles. In another approach, both magenta and black particles with different charges are introduced in a pixel of the type disclosed in relation to FIGS. 4a-4d. A layer of such pixels could be used in both display embodiments shown above. Since black determines luminance, it should have a high resolution, preferably the same resolution as magenta above.

Figure 5:
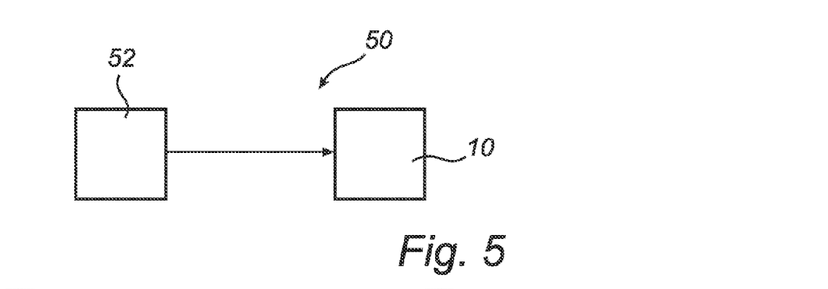
FIG. 5 is a schematic block diagram of a display system according to an embodiment of the present invention.

As illustrated in FIG. 5, the inventive display 10 is advantageously comprised in a display system 50, which in addition to the display 10 further comprises a display control unit 52 coupled to the display. Exemplary operations of the control unit 52 for a CMY-display 10 will be described in relation to FIGS. 6a and 6b.

Figure 6A:
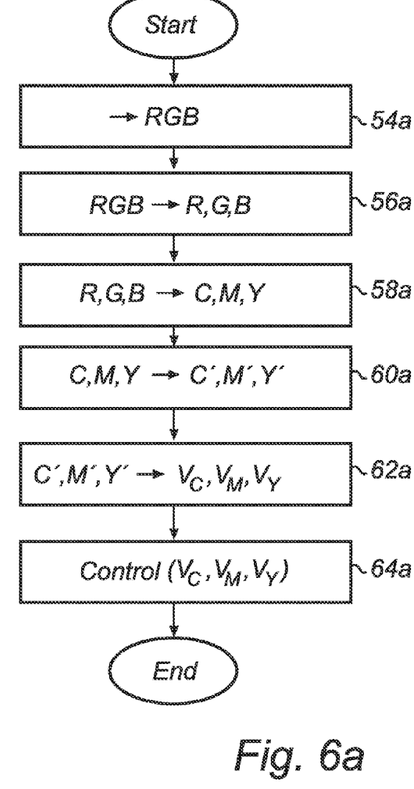
FIG. 6a-6b are flow charts of display control methods according to embodiments of the invention.

FIG. 6a is a flow chart of a first method for controlling the display 10, which method advantageously is executed by the display control unit 52. In step 54a, a conventional digital red, green, blue (RGB) video signal is received, which video signal represents images to be displayed on the display 10. In the conventional digital RGB video signal, all the colors typically have the same resolution. In step 56a, a gamma function is applied to the received RGB-signal, yielding R-, G- and B- components in the luminance domain. The R-, G- and B-components are then converted to C-, M- and Y-signals in step 58a. The conversion can for example be C=1−R, M=1−G, Y=1−B. Alternatively, look-up tables or other known conversion methods can be used. Then, a scaling function is applied in step 60a, wherein the C-, M- and Y-signals are scaled in accordance with the resolution of the corresponding layers, yielding signals C', M', Y'. It should be noted that since magenta generally has the highest resolution it is therefore usually not changed by the scaling, in which case M'=M. For scaling, any known appropriate method can be used, for example averaging, low pass filtering or Lagrange interpolation. Also, the appropriate method may use a smaller or larger subset of the entire video image. Drive signals VC, VM, VY are then calculated signals based on the C'-, M'- and Y'-signals (step 62a). Various methods for calculating drive signals are known per se and can be applied in the present invention. The drive signals may for instance be represented by (voltage or current) pulse heights, pulse durations, duty cycles, frequency, or a combination thereof, depending on the driving method of the display. Finally, in step 64a, the display 10 is controlled in accordance with the calculated drive signals VC, VM, VY.

Figure 6B:
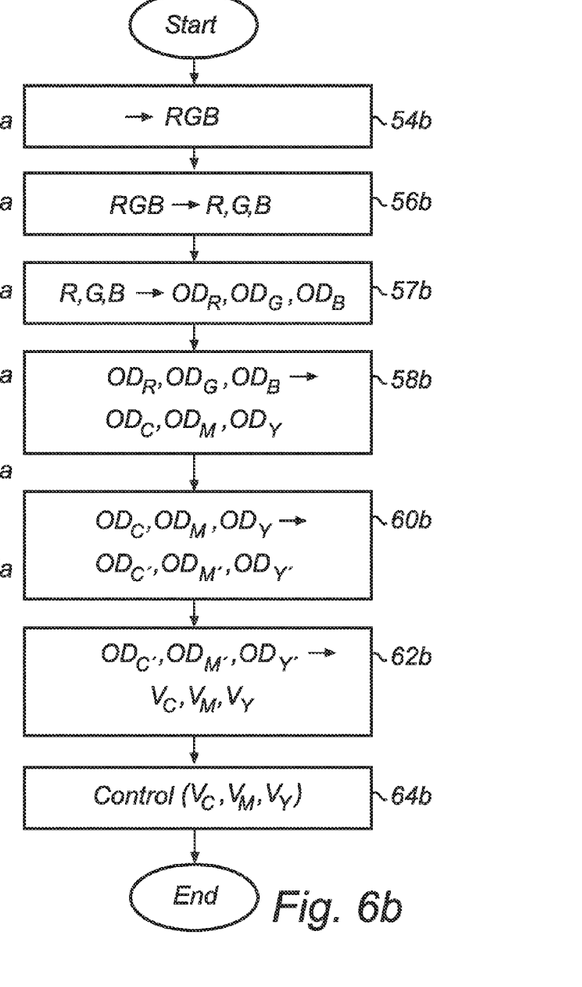

FIG. 6b is a flow chart of a second method for controlling the display 10, which method advantageously is executed by the display control unit 52. In step 54b, a conventional digital red, green, blue (RGB) video signal is received. In step 56b, a gamma function is applied, yielding R-, G- and B- components in the linear luminance domain. The R-, G- and B- components are then converted to the optical density domain in step 57b. The optical density OD is typically given by ODX=−log(X), where X is the value in the linear luminance domain. The optical densities for R, G and B are then converted to optical densities for C, M and Y (ODC, ODM, ODY) (step 58b), for instance by means of matrix operations or look-up tables. Then, a scaling function is applied in step 60b, wherein the optical densities for C, M- and Y are scaled in accordance with the resolution of the corresponding layers, yielding ODC', ODM', ODY'. As above, ODM' is usually equal to ODM. In an exemplary scaling operation, the optical density of a yellow pixel, which yellow pixel is 16 times larger than a magenta pixel, is obtained by averaging the yellow optical densities of 16 pixels in the original video image. Drive signals VC, VM, VY are then calculated signals based on the scaled optical densities for C, M and Y (step 62b). Finally, in step 64b, the display 10 is controlled in accordance with the calculated drive signals VC, VM, VY.

Variations in the above methods include omitting the gamma function (step 56), converting from RGB to CMY after scaling, scaling in the CIELab domain or other similar suitable domain (with corresponding conversions before and/or after scaling), etc. In a further variation the, source video signal could be coded differently than RGB, for example in the luminance/chrominance code (e.g. YUV) or directly as CMY. In the latter case, the RGB to CMY conversion above can be omitted, and the scaling can be done directly in one of the CMY domains (bit level, linear luminance or optical density).

Figure 7:
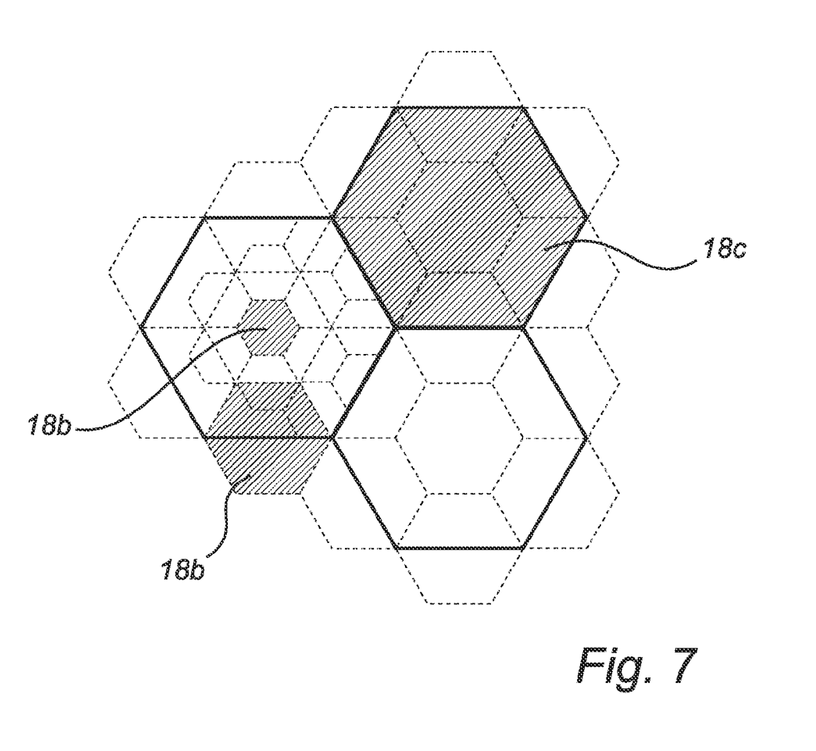
FIG. 7 is a top view illustrating an alternative pixel shape and layout.

Instead of the straightforward approach of using pixels with a square horizontal cross-section, as illustrated in FIGS. 1b and 3b, a layout with hexagonal pixels 18 arranged in a honeycomb pattern could advantageously be used, as illustrated in FIG. 7. Compared to the approach with square pixels, this design may be somewhat more demanding to manufacture, but it makes it inherently easier to display diagonal lines. Further, scaling may be less visible, especially since a magenta pixel 18a can be placed exactly in the center of each cyan pixel 18b and yellow pixel 18c. Also, any light shields may be less visible since the collector areas of the different layers are not vertically aligned to the same extent as in the approach with square pixels.

The person skilled in the art realizes that the present invention by no means is limited to the preferred embodiments described above. On the contrary, many modifications and variations are possible within the scope of the appended claims. For example, even though an electrophoretic display has been described, the inventive solution with different layers having different pixel resolutions can equally be applied to other displays, such as electrowetting or electrochromism displays. Such displays are known per se. Also, even though a CMY/CMYK display has been described, the inventive solution with different layers having different pixel resolutions can equally be applied to displays with different primary colors, such as a cyan-yellow-black-display or a cyan-orange-black-display, wherein black determining the luminance should have higher resolution than cyan and yellow/orange.

While the invention has been illustrated and described in detail in the drawings and foregoing description, such illustration and description are to be considered illustrative or exemplary and not restrictive; the inventions is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A display comprising:
a vertical stack of at least two different color absorbing layers of pixels, the at least two different color absorbing layers comprising a layer comprising at least one of the group of: cyan; and yellow; and
a layer comprising magenta, wherein pixel resolutions of the at least two different color absorbing layers is different,
wherein the layer comprising the at least one of the group of: cyan; and yellow is a top layer placed at a viewing side of the display and has a lower resolution than the layer comprising magenta, and wherein the layer comprising the at least one of the group of: cyan; and yellow is a yellow layer comprising the top layer placed at the viewing side of the display, wherein the layer comprising magenta is a bottom layer placed at an opposite side of the vertical stack opposite the viewing side, and wherein a layer comprising cyan is an intermediate layer, the bottom layer having higher resolution than the intermediate layer and the intermediate layer having higher resolution than the top layer.

2. The display of claim 1, wherein the layer having the lowest resolution is the top layer placed at the viewing side of the display, while layers having higher resolution are placed gradually further down in the vertical stack.

3. The display of claim 1, wherein at least one layer is provided with light shields for covering collector areas in the pixels of the at least one layer.

4. The display of claim 3, wherein the light shields are only provided in the layer comprising magenta.

5. The display of claim 1, wherein a shape of the pixels is one of the group of: square; and hexagonal.

6. The display of claim 1, wherein the display is one of the group of: electrophoretic, electrowetting and electrochromism display.

7. A display system, comprising:
a display comprising a vertical stack of at least two different color absorbing layers of pixels, wherein pixel resolutions of the at least two different color absorbing layers is different, and
a control unit configured to receive at least two different color video signals, scale a video signal of the at least two different color video signals having a reduced resolution in accordance with the pixel resolutions of the at least two different color absorbing layers, and control the display in accordance with the scaled input video signal,
wherein the control unit is further configured to not change by scaling a video signal of the at least two different color video signals having a highest resolution.

8. The display system of claim 7, wherein the at least two different color absorbing layers comprising one of the group of: a layer comprising cyan; and a layer comprising yellow; and one layer comprising magenta, wherein the layer comprising cyan or the layer comprising yellow has a lower resolution than the layer comprising magenta.

9. The display system of claim 7, wherein the control unit is adapted to scale the video signal by averaging, over a group of higher resolution pixels, a scaling property of one or more corresponding lower resolution pixel(s).

10. The display system of claim 9, wherein the scaling property is one of the group of: optical density, luminance, and bit level.

11. A method operating in a control unit for controlling a display comprising a vertical stack of at least two different color absorbing layers of pixels, wherein pixel resolutions of the at least two different color absorbing layers is different, the method comprising the acts of:
receiving at least two different color video signals;
scaling a video signal of the at least two different color video signals having a reduced resolution in accordance with the pixel resolutions of the at least two different color absorbing layers while leaving unchanged a video signal of the at least two different color video signals having a highest resolution; and
controlling the display in accordance with the scaled video signal.

12. The method of claim 11, wherein the at least two different color absorbing layers comprising one of the group of: a layer comprising cyan; and a layer comprising yellow; and one of a layer comprising magenta, wherein the layer comprising cyan or the layer comprising yellow has a lower resolution than the layer comprising magenta.

13. The method of claim 11, wherein the scaling comprises averaging, over a group of higher resolution pixels, a scaling property of one or more corresponding lower resolution pixel(s).

14. The display system of claim 7, wherein the at least two different color absorbing layers comprise at least one of the group of: cyan; and yellow; as a top layer placed at a viewing side of the display, the top layer having a lower resolution than a further layer comprising magenta.

15. The display system of claim 14, wherein the layer comprising at least one of the group of: cyan; and yellow; is a yellow layer comprising the top layer placed at the viewing side of the display, and wherein a layer comprising cyan is an intermediate layer, and wherein the layer comprising magenta is a bottom layer placed at the opposite side of the vertical stack, the bottom layer having higher resolution than the intermediate layer and the intermediate layer having higher resolution than the top layer.

16. The method of claim 11, wherein the at least two different color absorbing layers comprise at least one of the group of: cyan; and yellow; as a top layer placed at a viewing side of the display, the top layer having a lower resolution than a further layer comprising magenta.

17. The method of claim 16, wherein the layer comprising at least one of the group of: cyan; and yellow; is a yellow layer comprising the top layer placed at the viewing side of the display, and wherein a layer comprising cyan is an intermediate layer, and wherein the layer comprising magenta is a bottom layer placed at the opposite side of the vertical stack, the bottom layer having higher resolution than the intermediate layer and the intermediate layer having higher resolution than the top layer.

* * * * *